United States Patent Office 2,772,389
Patented Nov. 27, 1956

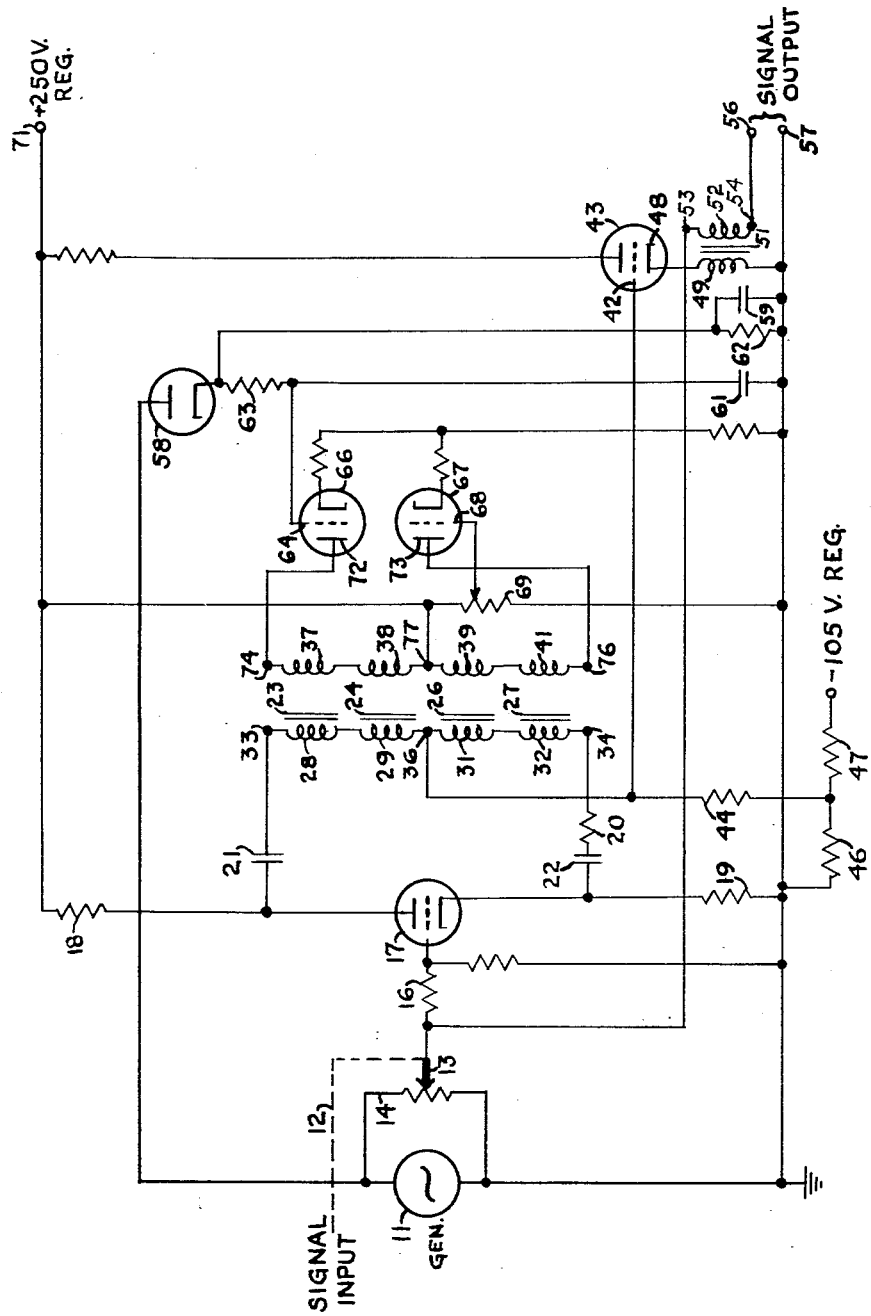

2,772,389

ELECTRICAL CONTROL SYSTEM

John W. Gray, Pleasantville, N. Y., assignor to General Precision Laboratory Incorporated, a corporation of New York Application March 1, 1954, Serial No. 413,201

4 Claims. (Cl. 323—45)

This invention relates to an electrical control system and more particularly to a system for providing a source of alternating current the voltage of which may be held to very close tolerances. The invention is specifically directed to a system for controlling an alternating current source by a regulated direct current voltage source.

In any automatic control system the accuracy is necessarily dependent upon the accuracy to which the power sources are held. The primary object of this invention is to provide a control system in which an alternating current source can be held to such close tolerances that it can be used either as a power source or as a source of carrier wave energy in which there will be no modulation in the output which is not due to the modulating input.

Another object is to provide an automatic electrical control system in which the alternating current output is regulated by using a regulated direct current voltage as an accurate reference level. Another object is to provide a modulating system in which any variations in the carrier energy source other than that produced by the modulating current will be automatically neutralized.

Other and further objects will become apparent from the following description when considered in connection with the single figure of the drawing which is a schematic circuit diagram embodying the invention.

Basically, the invention comprises a system in which a regulated source of direct current serves as a reference voltage with which a rectified alternating current voltage from the source to be controlled is compared in a differential amplifier, the latter energizing saturable reactor units which, in turn cause to be generated a counter voltage which exactly neutralizes any tendency for the voltage to vary from a predetermined value.

Referring to the drawing, an alternating current generator 11 comprises the voltage source to be controlled and may have any convenient frequency, such as 400 cycles per second. This source, after being regulated, may be used, for various purposes such as a regulated alternating current power source, or as a carrier voltage. In either event, the voltage on the slider 13 of a voltage divider 14 connected across the source 11 constitutes the input of the system and the controlled output is developed at the terminals 56 and 57.

The full voltage of the generator 11, of which the voltage at the slider 13 is always a proportionate value, is rectified by the diode 58 to provide a direct current voltage which may be compared with the voltage on a voltage divider 69 which is connected across the direct current reference voltage source represented by the terminal 71. The voltage rectified by the diode 58 is filtered by condensers 59 and 61 and the resistors 62 and 63 and is applied to the control grid 64 of a differential amplifier comprising triodes 66 and 67. The control grid 68 of the triode 67 may be maintained at a selected direct current voltage level by the adjustment of the slider on the voltage divider 69.

The function of the voltage divider 69 is to provide a means for manually setting the level of line voltage to which the alternating current output at terminals 56 and 57 is to be corrected. The output of the differential amplifiers 66 and 67 is derived from the respective anodes 72 and 73. The output of the triode 66 energizes the direct current control windings 37 and 38 of respective reactors 23 and 24 while the output of the triode 67 energizes the series connected direct current control windings 39 and 41 of the respective reactors 26 and 27, to control the reactance of the respective associated alternating current windings in a manner well known in the art. The comparison of the voltage applied to the grids 64 and 68 of the differential amplifier controls the alternating current potential of the center point 36 of the alternating current reactance windings 28, 29, 31, and 32, respectively, which are connected in series.

To this end, the voltage at the slider 13 is applied through an isolating resistor 16 to a phase inverter triode 17 having an anode resistor 18 and cathode resistor 19 of equal values of resistance.

The push-pull output of the triode 17 is taken from the anode and cathode through respective coupling condensers 21 and 22. The anode output from the condenser 21 being applied to the series alternating current windings 28, 29 while the cathode output from the condenser 22 is applied through the series resistor 20 and the series connected windings 31 and 32. The resistor 20 is inserted in the cathode branch circuit in order to equalize the impedances between the terminals 33 and 36 and 34 and 36, respectively. The reactance between the terminals 33 and 36 is represented as consisting of windings of two separate transformers 23 and 24. Likewise, the reactance between the terminals 34 and 36 consist of the windings of two separate transformers 26 and 27. It will be quite obvious that each of the pairs of reactors may be replaced by a single reactor, respectively, between the midpoint 36 and each of the respective terminals 33 and 34. Where separate reactors are used the direct current windings are connected in opposition so that the voltages induced in each phase of the differential amplifier will cancel. That is, the polarity of windings 37, 38 will be reversed with respect to each other and likewise the polarity of windings 39, 41 will be reversed with respect to each other.

The midpoint terminal 36 of the reactor windings is connected to the control grid 42 of a cathode follower triode 43, with the negative bias being supplied through a resistor 44 and a voltage divider comprising resistors 46 and 47. The cathode 48 of the triode 43 is connected to the ground through the primary winding 49 of a transformer 51. The secondary 52 of the transformer 51 is connected between the input slider 13 and the output terminal 56. Accordingly, as the potential of the midpoint 36 of the reactor windings varies with respect to the ground, as determined by the relative amounts of direct current flowing through the direct current windings, a control signal voltage will be impressed upon the grid 42 of the triode 43 to provide a voltage in winding 49 of the appropriate phase and amplitude to neutralize any variation of the output voltage due to any variation in the voltage of the generator 11 from that value determined by the position of the slider on the voltage divider 69. In other words, the only variations in the voltage appearing at the output terminals 56 and 57, are those due to modulation or variation of the voltage at the slider 13, other than that caused by variations in the source 11.

In the operation of this invention, first let it be assumed that the system is operating as a voltage regulating system. Assuming that the slider 13 is at a fixed position on the slider 14, if the voltage of the generator 11 should vary, the rectified alternating current potential applied to the control grid 64 of the differential amplifier triode 66 will vary with respect to the potential of the slider on the potential divider 69 which is connected across the regulated direct current source 71. This will cause a change in the relative values of the reactances between the terminals 33 and 36 and terminals 34 and 36 causing the potential of the midpoint 36 to vary and change the control potential on the grid 42 of the triode 43. This latter change will cause a compensating voltage to be applied to the primary winding 49 on the transformer 51 thereby inducing a voltage in the secondary winding 52 to oppose any change in the output potential between the terminals 56 and 57. It will be noted that this regulating action will be almost instantaneous and will respond to a portion of a cycle or will continue to apply a cylical correction for an indefinite period.

In the other instance, assume that the voltage at the slider 13 is modulated in any manner such as by a mechanical movement applied to the slider 13. The output voltage between the terminals 56 and 57 will vary in accordance with the change of the position of the slider 13 irrespective of any changes in the voltage of the source 11. However, if at the same time the alternating current voltage of the generator 11 should depart from the selected value as determined by the setting of the slider on the voltage divider 69, as for example, by increasing the change in the voltage at the position of the pointer 13 on the voltage divider 14 due to the change in drop in the potential across the latter will cause an increase in the voltage applied to the control electrode 64 of the differential amplifier. If this voltage is more positive than the voltage applied to the control electrode 68 as determined by the position of the slider on the voltage divider 69, the triode 66 will draw more current through the direct current control windings 37 and 38 than will flow through the direct current control windings 39 and 41, thus increasing the magnetic flux of the respective cores of the reactors accordingly and inversely decreasing the reactance of the windings 28 and 29. This causes the potential of center point terminal 36 to shift toward the electrical potential of the terminal 33. This causes the potential applied to the control grid 42 of the triode 43 to change the current through the primary winding 49 of the transformer 51 and induce in the secondary winding 52 a voltage of such magnitude and phase as to oppose any change in the output potential other than that which would be produced by movement of the slider 13 on the voltage divider 14. Accordingly, the output voltage at the terminals 56 and 57 will include only variations due to the movement of the slider 13.

From the foregoing it will be apparent that the present invention provides a novel and improved electrical control system which has many uses. The system is versatile in that the stabilized output voltage may be readily varied and it is flexible in that in the case of modulation the modulation signal may be applied electrically or mechanically. It is to be noted that the regulating action responds almost instantaneously to follow fast or slow voltage variations. It can also produce continuously an alternating current voltage to add to or subtract from the voltage of the source generator 11; the energy for the correction voltage being supplied in all instances from the regulated direct current source represented by the terminal 71.

What is claimed is:

1. In an electrical control system, a source of alternating current voltage to be controlled, a source of direct current voltage to serve as a reference voltage, two saturable reactors each having an alternating current winding and a direct current winding, means connecting said two alternating current windings in series at a common terminal, means for applying an alternating current voltage derived directly from said alternating current source and including all the characteristics of the voltage of said alternating current source to said alternating current windings in series, means for applying direct currents to said direct current windings, the relative values of said currents representing the deviation of the voltage of said alternating current source from a preselected potential to thereby vary the respective reactances of the corresponding alternating current windings in amplitude and phase sense to produce an alternating current correction potential at said terminal, and means for adding said correction potential to said alternating current potential in such phase as to oppose any variations of said alternating current potential from said preselected value.

2. In an electrical control system, a source of alternating current voltage to be controlled, a source of direct current voltage to serve as a reference voltage, two saturable reactors each having an alternating current winding and a direct current winding, said alternating current windings being connected together in series at a common terminal, means for generating a composite alternating current voltage which contains the alternating current source voltage as a component, means for applying an alternating current voltage having all the characteristics of said composite voltage to said alternating current windings in series, rectifying means for deriving a direct current potential representing the voltage of said alternating current source, a differential direct-coupled amplifier having one phase biased to a potential taken from said direct current source representing a preselected value of potential level of said alternating current source, whereby the output of said amplifier represents the differential between said selected potential and said composite alternating current voltage, means for applying the output of said differential amplifier to said direct current windings thus causing the reactance of the corresponding associated alternating current windings to vary in accordance with the output of said amplifier so that the potential of said common terminal represents the difference between said preselected potential and said composite voltage, means responsive to said difference potential for providing a correction potential which when added to said composite voltage in the proper phase will cancel the deviation of the voltage of said alternating current source voltage from said preselected potential level.

3. In an electrical system, a source of alternating current voltage from which a constant output alternating current voltage is to be provided, a source of direct current voltage to serve as a reference voltage, means conjointly controlled by said source of direct current and said source of alternating current for deriving an alternating current voltage having all the characteristics of the voltage of the alternating current source, means controlled by said alternating current source for deriving a direct current potential proportional to the voltage of said alternating current source and means conjointly responsive to the relative changes in magnitude between said direct current voltage and said derived alternating current voltage for producing an alternating current voltage of such magnitude and phase as to substantially neutralize any variation in the magnitude of said alternating current voltage and means for adding said correction voltage to the voltage of said alternating voltage source.

4. In an electrical control system, a source of alternating current voltage, a controlled alternating current output circuit, a source of direct current voltage to serve as a fixed reference voltage, saturable reactor means having respective alternating current and direct current windings, means conjointly controlled by said source of direct current and said source of alternating current for deriving an alternating current voltage having all the characteristics of said alternating current source, means for energizing said alternating current windings from said source of derived alternating current potential, means for applying to one of said direct current windings a direct current representing the desired level of the alternating current output voltage, means controlled by said alternating current source for supplying direct current proportional to said alternating current source to the other of said direct current windings, means responsive to the relative changes produced in the reactance of the respective alternating current windings resulting from energization of the respective direct current windings for producing a correction voltage of such magnitude and phase as to compensate for any variation in the magnitude of the voltage of said alternating current source, and means for adding said correction voltage to the voltage of said alternating current source in said controlled alternating current circuit.

References Cited in the file of this patent

UNITED STATES PATENTS

| | | |
|---|---|---|
| 2,129,890 | Trucksess | Sept. 13, 1938 |
| 2,619,630 | Stone | Nov. 25, 1952 |
| 2,638,571 | Schultz | May 12, 1953 |
| 2,644,128 | Henrich | June 30, 1953 |